United States Patent
Kim et al.

(10) Patent No.: US 9,447,288 B2
(45) Date of Patent: Sep. 20, 2016

(54) ANTI-REFLECTIVE COATING COMPOSITION PROVIDING IMPROVED SCRATCH RESISTANCE, ANTI-REFLECTIVE FILM USING THE SAME, AND MANUFACTURING METHOD THEREOF

(71) Applicant: LG Chem, Ltd., Seoul (KR)

(72) Inventors: Heon Kim, Daejeon (KR); Joon-Koo Kang, Daejeon (KR); Yeong-Rae Chang, Daejeon (KR); Hye-Min Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 196 days.

(21) Appl. No.: 14/237,523

(22) PCT Filed: Sep. 28, 2012

(86) PCT No.: PCT/KR2012/007952
§ 371 (c)(1),
(2) Date: Feb. 6, 2014

(87) PCT Pub. No.: WO2013/048205
PCT Pub. Date: Apr. 4, 2013

(65) Prior Publication Data
US 2014/0154486 A1    Jun. 5, 2014

(30) Foreign Application Priority Data

Sep. 29, 2011   (KR) .................. 10-2011-0099359
Sep. 28, 2012   (KR) .................. 10-2012-0109042

(51) Int. Cl.
| C09D 5/00 | (2006.01) |
| C08K 7/22 | (2006.01) |
| G02B 1/10 | (2015.01) |
| G02B 1/11 | (2015.01) |
| C09D 7/12 | (2006.01) |
| C09D 4/00 | (2006.01) |
| C08F 220/22 | (2006.01) |
| C08F 222/10 | (2006.01) |
| C08K 7/26 | (2006.01) |

(52) U.S. Cl.
CPC .............. *C09D 5/006* (2013.01); *C08F 220/22* (2013.01); *C08F 222/1006* (2013.01); *C09D 4/00* (2013.01); *C09D 7/1266* (2013.01); *C09D 7/1275* (2013.01); *C09D 7/1291* (2013.01); *G02B 1/105* (2013.01); *G02B 1/11* (2013.01); *C08F 2410/04* (2013.01); *C08K 7/26* (2013.01); *Y10T 428/24967* (2015.01); *Y10T 428/249974* (2015.04)

(58) Field of Classification Search
CPC ............ C08K 7/22; C08K 7/24; C08K 7/26; C08K 7/28; C09D 5/006
USPC ...... 428/215, 313.9; 427/162, 517; 524/847, 524/851; 522/71
See application file for complete search history.

(56) References Cited

U.S. PATENT DOCUMENTS

2006/0274423 A1*  12/2006  Fukushige .............. G02B 1/111
                                                            359/659
2007/0231566 A1   10/2007  Yoneyama et al.

FOREIGN PATENT DOCUMENTS

| CN | 101002113 A | 7/2007 |
| EP | 1811319 A1 | 7/2007 |
| JP | 2006048025 A | 2/2006 |
| JP | 2006072320 A | 3/2006 |
| JP | 2007-262124 A | 10/2007 |
| JP | 2007293301 A | 11/2007 |
| JP | 2009-197155 A | 9/2009 |
| JP | 2009197155 A * | 9/2009 |
| JP | 2010152311 A | 7/2010 |
| JP | 2010256880 A | 11/2010 |
| JP | 2011-133843 A | 7/2011 |
| KR | 1020070067245 A | 6/2007 |
| KR | 1020080050335 A | 6/2008 |
| WO | 2005-103175 A1 | 11/2005 |
| WO | 2011/001713 A1 | 1/2011 |

OTHER PUBLICATIONS

Machine translation of JP 2009-197155A.*
Esacure by Lamberti: "Photoinitiators for Radiation Curing", 18 pages, Jan. 2008.

* cited by examiner

*Primary Examiner* — Vu A Nguyen
(74) *Attorney, Agent, or Firm* — Dentons US LLP

(57) ABSTRACT

The present invention relates to an anti-reflective coating composition providing improved scratch resistance, a method for manufacturing an anti-reflective film using the same, and an anti-reflective film manufactured thereby. According to the present invention, provided are a composition that is able to form a coating layer having improved surface scratch resistance, while forming one or more layers by a single coating process, and an anti-reflective film manufactured by using the same.

15 Claims, No Drawings

ANTI-REFLECTIVE COATING COMPOSITION PROVIDING IMPROVED SCRATCH RESISTANCE, ANTI-REFLECTIVE FILM USING THE SAME, AND MANUFACTURING METHOD THEREOF

This application is a national stage application of International Application No. PCT/KR2012/007952, filed on Sep. 28, 2012, which claims priority to and the benefit of Korean Patent Application Nos. 10-2011-0099359, filed on Sep. 29, 2011, and 10-2012-0109042, filed on Sep. 28, 2012, in the Korean Intellectual Property Office, the entire content of which are incorporated herein by reference.

TECHNICAL FIELD

The present invention relates to an anti-reflective coating composition providing improved scratch resistance, a method for manufacturing an anti-reflective film using the same, and an anti-reflective film manufactured thereby.

BACKGROUND OF ART

In general, an anti-reflective film is disposed on the flat panel display devices such as PDP, LCD or the like in order to minimize the reflection of external light.

The commonly used anti-reflective film has a three-layer structure of a hard coat layer and high and low refractive index layers with a thickness of 1 μm or less, which are laminated on a light-transparent substrate film. A two-layer structure of high and low refractive index layers laminated on the substrate film has been also commercialized in order to simplify the production process.

These anti-reflective films are manufactured by a dry or wet method.

Of the methods, the dry method is a method of laminating a low refractive index material (e.g., $MgF_2$, $SiO_2$, etc.) as a thin film or alternately laminating a high refractive index material (e.g., ITO (tin-doped indium oxide), ATO (tin-doped antimony oxide), ZnO, $TiO_2$, etc.) and the low refractive index material on the substrate film by deposition or sputtering. The drying method has an advantage of manufacturing anti-reflective films having superior adhesion at a film interface, but requires high production cost, which is a limitation for commercial use.

Meanwhile, the wet method is a method of drying and curing a coating composition containing a polymer resin, an organic solvent, etc., after applying it onto the substrate film. This method is less expensive than the dry method, and thus widely used in commercial applications.

In the wet method, however, processes for forming the hard coat layer and the high and low refractive index layers included in the anti-reflective film should be conducted separately. Thus, the production process becomes complicated, and offers weak adhesion at a film interface.

For this reason, many studies have been actively made to develop an anti-reflective coating composition capable of forming two or more layers by a single wet coating process.

However, there are still many problems that phase separation does not properly occur upon applying the composition during the production process, and thus individual layers deteriorate in functions, or scratch resistance of the low refractive index layer placed on the film surface deteriorates.

DETAILED DESCRIPTION OF THE INVENTION

Technical Problem

Accordingly, the present invention relates to an anti-reflective coating composition capable of providing improved scratch resistance, while forming one or more layers by a single coating process.

Further, the present invention provides a method for manufacturing an anti-reflective film using the composition in a simpler manner.

Further, the present invention provides an anti-reflective film manufactured by using the composition.

Technical Solution

According to one embodiment of the present invention, provided is an anti-reflective coating composition including a (meth)acrylate-based compound; hollow particles; a initiator having a first molecular weight; a initiator having a second molecular weight higher than the first molecular weight; and a solvent.

Herein, the first molecular weight may be less than 420, and the second molecular weight may be 420 to 1000.

The anti-reflective coating composition may include 5 to 50 parts by weight of the hollow particles, 1 to 30 parts by weight of the initiator having the first molecular weight, 1 to 20 parts by weight of the initiator having the second molecular weight, and 100 to 500 parts by weight of the solvent, based on 100 parts by weight of the (meth)acrylate-based compound.

The (meth)acrylate-based compound may include a multifunctional (meth)acrylate-based compound having 2 to 10 functional groups, and a (meth)acrylate-based compound having a fluorine-containing substituent. For example, the (meth)acrylate-based compound may include the (meth)acrylate-based compound having a fluorine-containing substituent and the multifunctional (meth)acrylate-based compound having 2 to 10 functional groups at a weight ratio of 1:10 to 1:300.

In this regard, the (meth)acrylate-based compound having a fluorine-containing substituent and the multifunctional (meth)acrylate-based compound may have a surface energy difference of 5 mN/m or higher.

Meanwhile, the hollow particles included in the composition may have a number average diameter of 1 to 200 nm.

Further, the hollow particles may be hollow silica particles.

Further, the solvent included in the composition may have a dielectric constant (25° C.) of 20 to 30, and a dipole moment of 1.7 to 2.8.

The composition may further include inorganic nanoparticles having a number average diameter of 1 to 50 nm.

Meanwhile, according to another embodiment of the present invention, provided is a method for manufacturing an anti-reflective film, including the steps of preparing the above-mentioned anti-reflective coating composition; applying the composition onto at least one surface of a substrate film; drying the applied composition; and curing the dried composition layer.

In the manufacturing method, the composition applied onto the substrate film may be spontaneously phase-separated into a first layer containing the initiator having the first molecular weight; and a second layer containing the hollow particles and the initiator having the second molecular weight, in which these layers are formed sequentially from the substrate film.

Further, the drying process of the composition may be performed at a temperature of 5 to 150° C. for 0.1 to 60 minutes.

Further, the curing process of the composition may be performed at a UV radiation dose of 0.1 to 2 J/cm² for 1 to 600 seconds.

Meanwhile, according to still another embodiment of the present invention, provided is an anti-reflective film, including a first layer that includes a first (meth)acrylate-based binder and the initiator having the first molecular weight in the first (meth)acrylate-based binder, and is formed on the substrate film; and a second layer that includes a second (meth)acrylate-based binder and the hollow particles and the initiator having the second molecular weight higher than the first molecular weight in the second (meth)acrylate-based binder, and is formed on the first layer.

In this regard, the first (meth)acrylate-based binder may include a crosslinked polymer of the multifunctional (meth)acrylate-based compound having 2 to 10 functional groups, and the second (meth)acrylate-based binder may include a crosslinked polymer of the (meth)acrylate-based compound having a fluorine-containing substituent. Further, the first and second (meth)acrylate-based binders may further include a crosslinked copolymer of the multifunctional (meth)acrylate-based compound having 2 to 10 functional groups and the (meth)acrylate-based compound having a fluorine-containing substituent, respectively.

Further, the first layer may have a thickness of 2 to 15 μm, and the second layer may have a thickness of 100 to 200 nm.

Advantageous Effects

Owing to spontaneous phase separation, the anti-reflective coating composition according to the present invention can be used to form one or more layers by a single coating process, thereby manufacturing an anti-reflective film in a simpler manner. In particular, the anti-reflective film manufactured by using the composition is able to maintain more improved interface adhesion and scratch resistance and to show an excellent anti-reflective effect, and thus it can be preferably used as an anti-reflective film in display devices, etc.

BEST MODE FOR CARRYING OUT THE INVENTION

Hereinafter, an anti-reflective coating composition, an anti-reflective film using the same, and a manufacturing method thereof according to embodiments of the present invention will be described.

In advance, unless otherwise specified throughout the specification, several terms used herein are defined as follows.

First, the term 'hollow particle' collectively means an organic or inorganic nanoparticle having a void on the surface thereof and/or therein. For example, the term 'hollow silica particle' may refer to a hollow particle that is generated from a silicon compound or an organic silicon compound and has a void on the surface of and/or inside the silica particle.

Further, a potential energy that tends to minimize free surface area is called 'surface energy', and the reduced surface energy per unit surface area is defined as 'surface tension'. That is, surface tension and surface energy represent tendency to minimize surface area, and have the same or equivalent physical dimensions.

Further, the term '(meth)acrylate' is defined to encompass acrylate and methacrylate. The term '(meth)acrylate' may be also defined to have no fluorine-containing substituent, and a compound having the fluorine-containing substituent may be referred to as a '(meth)acrylate compound having a fluorine-containing substituent', in order to distinguish therebetween.

Further, the term 'coating layer' means a composition layer formed by applying (coating) the after-mentioned anti-reflective coating composition on a predetermined substrate film.

Further, the term 'phase separation' means to form a distribution difference of a particular ingredient included in the composition due to a difference in density, surface tension, or other physical properties of the components. Herein, when phase separation of the coating layer occurs, at least two layers can be distinguished according to the distribution of a particular component, for example, distribution of hollow particles.

Further, the term 'hard coat layer' or 'high refractive index layer' means a layer that has a higher refractive index than the after-mentioned low refractive index layer and substantially no hollow particles, and that is located below the low refractive index layer (below the coating layer) based on the distance from the substrate film. Herein, the phrase 'substantially no hollow particles' means that the hollow particles are included in an amount of less than 1% by weight, based on the total content of the hollow particles included in the composition.

Further, the term 'low refractive index layer' means a layer that has a lower refractive index than the above-mentioned hard coat layer or high refractive index layer and a high distribution ratio of the hollow particles, and that is located above the hard coat layer or the high refractive index layer (above the coating layer), based on the distance from the substrate film.

Throughout the specification, the terms including an ordinal number such as 'first', 'second', etc., can be used to describe various components, but such components are not limited to those terms. The terms are only to distinguish one component from another. For example, a first component may be named as a second component, and vice versa, without departing from the scope of the present invention.

Meanwhile, the present inventors have made efforts to study the anti-reflective coating composition, and they found that when spontaneous phase separation is induced by using the after-mentioned composition to form the anti-reflective film, the anti-reflective film has more improved scratch resistance, together with superior anti-reflective effect and interface adhesion, thereby completing the present invention. It is likely that the anti-reflective film is provided with such superior characteristics because a sufficient curing degree of the surface of the coating layer is obtained due to the initiator having the higher molecular weight which is not infiltrated into the lower portion of the coating layer during phase separation of the composition.

That is, in the previous method for improving surface scratch resistance of the coating layer, the content of inorganic nanoparticles or hollow particles, or the content of binder was usually controlled, but scratch resistance was not sufficiently improved. In addition, during the drying process of the applied composition, the initiator usually infiltrates toward (that is, gravitates to) the substrate film due to gravity, and therefore, the sufficient curing degree of the upper portion of the coating layer cannot be obtained, problematically.

From this point of view, in the present invention, two or more initiators having different molecular weights are added to the composition, and thus the initiator having higher molecular weight does not infiltrate into the lower portion of the coating layer but remains in the upper portion thereof upon phase separation of the composition. Consequently, sufficient curing of the upper portion of the coating layer is induced during a photo-curing process, resulting in superior scratch resistance of the anti-reflective film.

According to one embodiment of the present invention, provided is an anti-reflective coating composition including
a (meth)acrylate-based compound;
hollow particles;
a initiator having a first molecular weight;
a initiator having a second molecular weight higher than the first molecular weight; and
a solvent.

Hereinafter, individual components included in the composition will be described.

(Meth)acrylate-Based Compound

First, the (meth)acrylate-based compound is a compound capable of forming a binder upon curing of the composition. A photo-curable compound (capable of forming a cross-linked polymer by photo-energy source such as UV) typically used in the art to which the present invention pertains (hereinafter, referred to as 'in the art') can be applied.

In particular, according to the present invention, the (meth)acrylate-based compound may include a multifunctional (meth)acrylate compound having 2 to 10 functional groups and a (meth)acrylate-based compound having a fluorine-containing substituent, in order to facilitate induction of the proper phase separation and sufficient cross-linking polymerization when the composition is applied.

That is, when the multifunctional (meth)acrylate compound and the (meth)acrylate-based compound having a fluorine-containing substituent are mixed, spontaneous phase separation may be induced by the surface energy characteristics of the compounds. In this regard, the (meth)acrylate-based compound having a fluorine-containing substituent may have the surface energy of 10 to 25 mN/m. In particular, the surface energy difference between the (meth)acrylate-based compound having a fluorine-containing substituent and the multifunctional (meth)acrylate-based compound is 5 mN/m or higher, which is advantageous in terms of effective phase separation.

According to one embodiment of the present invention, the (meth)acrylate-based compound includes the (meth)acrylate-based compound having a fluorine-containing substituent and the multifunctional (meth)acrylate-based compound at a weight ratio of 1:10 to 1:300, which is advantageous in terms of the above effect. That is, in the (meth)acrylate-based compound included in the composition of the present invention, the weight ratio of the (meth)acrylate-based compound having a fluorine-containing substituent: the multifunctional (meth)acrylate-based compound is controlled within the range of 1:10 to 1:300, preferably 1:40 to 1:250, and more preferably 1:50 to 1:200, which is advantageous in terms of effective phase separation of the composition.

Herein, the multifunctional (meth)acrylate-based compound has 2 to 10, preferably 2 to 8, and more preferably 2 to 7 functional groups, which is advantageous in terms of efficient formation of cross-linked polymer.

Examples of the multifunctional (meth)acrylate-based compound may include dipentaerythritol hexaacrylate, pentaerythritol triacrylate, pentaerythritol tetraacrylate, trimethylenepropane triacrylate, ethylene glycol diacrylate, 9,9-bis(4-(2-acryloxyethoxy)phenyl)fluorene, bis(4-methacryloxy thiophenyl)sulfide, or the like; and it may be preferably one or more compounds selected from the group consisting of the compounds.

The (meth)acrylate-based compound having a fluorine-containing substituent which satisfies the above-mentioned surface energy characteristics may be one or more compounds selected from the group consisting of the compounds of the following Chemical Formulae 1 to 5:

[Chemical Formula 1]

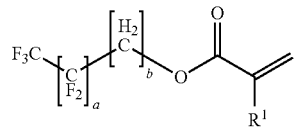

wherein $R^1$ is a hydrogen group or an alkyl group having 1 to 6 carbon atoms, a is an integer of 0 to 7, and b is an integer of 1 to 3;

[Chemical Formula 2]

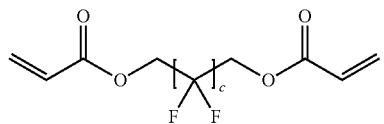

wherein c is an integer of 1 to 10;

[Chemical Formula 3]

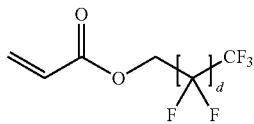

wherein d is an integer of 1 to 11;

[Chemical Formula 4]

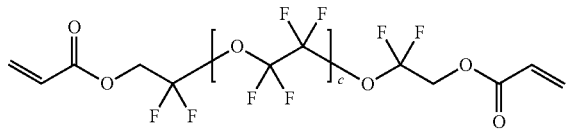

wherein e is an integer of 1 to 5;

[Chemical Formula 5]

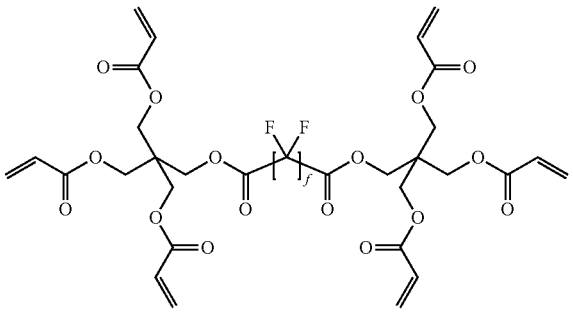

wherein f is an integer of 4 to 10.

Hollow Particles

Meanwhile, the anti-reflective coating composition of the present invention includes hollow particles.

The hollow particles collectively mean organic or inorganic nanoparticles having voids on the surface thereof and/or therein. The hollow particles have a lower refractive index than compact particles, thereby exhibiting excellent anti-reflective properties. Upon phase separation of the composition, the hollow particles are mainly distributed near the surface of the coating layer, or distributed with an increasing distribution ratio far from the substrate film, so as to provide the effects of increasing film strength and scratch resistance.

Herein, the hollow particles may be those having a number average diameter of 1 to 200 nm, preferably 5 to 100 nm, and more preferably 10 to 80 nm; and the particles are preferably spherical in shape, but amorphous particles may be also used.

In addition, the hollow particles has silica as a main ingredient (hereinafter, referred to as 'hollow silica particles'), which is more advantageous in terms of particle durability and control of refractive index.

In the composition, the hollow particles may be included in a colloidal phase with a solid content of 5 to 40% by weight. According to the present invention, the colloidal phase including the hollow particles may include water or an organic solvent as a dispersion medium. Herein, the organic solvent of the dispersion media may include alcohols such as methanol, isopropyl alcohol, ethylene glycol, and butanol; ketones such as methyl ethyl ketone and methyl isobutyl ketone; aromatic hydrocarbons such as toluene and xylene; amides such as dimethyl formamide, dimethyl acetamide, and N-methyl pyrrolidone; esters such as ethyl acetate, butyl acetate, and gamma-butyrolactone; ethers such as tetrahydrofuran and 1,4-dioxane; or mixtures thereof.

The hollow particles may be included in an amount of 5 to 50 parts by weight, preferably 5 to 45 parts by weight, and more preferably 5 to 40 parts by weight, based on 100 parts by weight of the (meth)acrylate-based compound. That is, in order to provide the minimal anti-reflective effect for the coating layer formed by using the compound of the present invention, it is advantageous that the hollow particles are included in an amount of 5 parts by weight or more, based on 100 parts by weight of the (meth)acrylate-based compound. If the excessive amount of the hollow particles is added, the coating layer becomes thick to adversely reduce the anti-reflective effect. In order to prevent this problem, it is advantageous that the hollow particles are included in an amount of 40 parts by weight or less, based on 100 parts by weight of the (meth)acrylate-based compound.

Initiator

Meanwhile, the anti-reflective coating composition of the present invention includes a initiator having a first molecular weight and a initiator having a second molecular weight higher than the first molecular weight at the same time.

According to the present invention, the initiator having the higher second molecular weight is not infiltrated into the binder of the lower portion of the coating layer but remains in the upper portion thereof, even though gravity is acting upon phase separation of the composition. Consequently, sufficient curing of the upper portion of the coating layer can be induced during the curing process of the phase-separated coating layer, thereby providing an anti-reflective film having more improved scratch resistance.

That is, during the drying process of the applied composition, the initiator usually infiltrates toward (that is, gravitates to) the substrate film due to gravity, and therefore, the sufficient curing degree of the upper portion of the coating layer cannot be obtained.

From this point of view, two or more initiators having different molecular weights are included in the composition according to the present invention, thereby providing an anti-reflective film having more improved scratch resistance due to the above actions.

According to the present invention, the molecular weight range of the initiator is preferably determined, considering the type and content of the (meth)acrylate-based compound to be used, infiltration of the composition into the high refractive index layer (into lower portion of the coating layer) upon phase separation, etc. According to one embodiment of the present invention, the first molecular weight may be less than 420, and the second molecular weight may be 420 to 1000; preferably, the first molecular weight may be less than 420, and the second molecular weight may be 430 to 950; and more preferably, the first molecular weight may be less than 420, and the second molecular weight may be 440 to 900. That is, according to the present invention, both of the initiator having a molecular weight of less than 420 and the initiator having a molecular weight of 420 or more may be preferably included in the composition in order to achieve the above effect. If any one of them is not satisfied, curing does not evenly occur on the coating layer, and therefore, it is not expected to form an anti-reflective film having improved scratch resistance.

Meanwhile, any of the initiators typically used in the art may be used regardless of the specific type of the compound, as long as it satisfies the above-mentioned molecular weight range.

The initiator having the first molecular weight may be included in an amount of 1 to 30 parts by weight, preferably 1 to 25 parts by weight, and more preferably 1 to 20 parts by weight, based on 100 parts by weight of the (meth)acrylate-based compound. That is, since the initiator having the first molecular weight has a relatively low molecular weight, it is able to infiltrate into the lower portion of the coating layer (first layer, high refractive index layer) upon phase separation of the composition. For sufficient curing of the lower portion of the coating layer, the initiator having the first molecular weight is preferably included in an amount of 1 part by weight or more, based on 100 parts by weight of the (meth)acrylate-based compound. In addition, if an excessive amount of the initiator is included, the residual amount of the initiator is increased to deteriorate physical properties of the coating layer, such as abrasion resistance, etc. In order to prevent this problem, the initiator having the first molecular weight is preferably included in an amount of 30 parts by weight or less, based on 100 parts by weight of the (meth)acrylate-based compound.

The initiator having the second molecular weight may be included in an amount of 1 to 20 parts by weight, preferably 1 to 15 parts by weight, and more preferably 2 to 15 parts by weight, based on 100 parts by weight of the (meth)acrylate-based compound. That is, since the initiator having the second molecular weight has a relatively high molecular weight, it cannot infiltrate into the lower portion of the coating layer (first layer, high refractive index layer) and is placed in the upper portion thereof (second layer, low refractive index layer) upon phase separation of the composition. Therefore, to ensure the minimal curing degree required in the upper portion of the coating layer, the initiator having the second molecular weight is preferably included in an amount of 1 part by weight or more, based on 100 parts by weight of the (meth)acrylate-based compound.

When an excessive amount of the photo initiator is added, the physical properties of the coating layer, such as abrasion resistance, can be deteriorated. In order to prevent this problem, the initiator having the second molecular weight is preferably included in an amount of 20 parts by weight or less, based on 100 parts by weight of the (meth)acrylate-based compound.

The initiators can be also provided with a solubility difference, in addition to the molecular weight difference therebetween. However, the solubility of the initiator is one of the physical properties that can be ultimately affected by its molecular weight. Since the initiator having a higher molecular weight has lower solubility, a smaller amount thereof is infiltrated into the lower portion of the coating layer, and a larger amount thereof is distributed in the upper portion of the coating layer, thereby inducing sufficient curing of the surface. It is apparent that another physical property directly or indirectly affected by the molecular weight of the initiator or other physical properties causing the similar behavior can be also applied in other embodiments of the present invention.

Solvent

Meanwhile, the anti-reflective coating composition of the present invention includes a solvent.

Any solvent typically used in the art can be used, as long as it does not deteriorate the physical properties of the composition. According to the present invention, however, the solvent has a dielectric constant (25° C.) of 20 to 30 and a dipole moment of 1.7 to 2.8, which is preferable in terms of favorable induction of phase separation of the composition.

Non-limiting examples of the solvent satisfying the physical properties may include methyl ethyl ketone, ethyl acetate, acetyl acetone or the like. Examples of the solvent may further include one or more selected from the group consisting of isobutyl ketone, methanol, ethanol, n-butanol, i-butanol, and t-butanol, which are typically used in the art, in addition to the solvent satisfying the physical properties. However, the solvent satisfying the dielectric constant and the dipole moment is included in an amount of 60% by weight or more, based on the total weight of the solvent, which is preferable in terms of favorable induction of phase separation of the composition.

The solvent may be included in an amount of 100 to 500 parts by weight, preferably 100 to 450 parts by weight, and more preferably 100 to 400 parts by weight, based on 100 parts by weight of the (meth)acrylate-based compound. If the composition shows bad flowability upon coating, defects such as stripes on the coating layer may be generated. In order to provide the composition with the minimum flowability required, the solvent is preferably included in an amount of 100 parts by weight or more, based on 100 parts by weight of the (meth)acrylate-based compound. When an excessive amount of the solvent is added, the solid content becomes too low, and therefore, defects may be generated upon drying and curing. In order to prevent this problem, the solvent is preferably included in an amount of 500 parts by weight or less, based on 100 parts by weight of the (meth)acrylate-based compound.

Inorganic Nanoparticles and Other Components

The anti-reflective coating composition of the present invention may further include inorganic nanoparticles, if necessary. The inorganic nanoparticles may be distributed throughout the coating layer during the drying process of the applied composition. In particular, the inorganic nanoparticles contribute to improvement of film strength so as to provide improved scratch resistance.

In this regard, the inorganic nanoparticles typically used in the art may be used, and silica particles are preferably used. Unlike the above-mentioned hollow particles, it is not necessary to use the inorganic nanoparticles having voids, and it is possible to use amorphous inorganic nanoparticles.

The diameter of the inorganic nanoparticles may be determined considering the solvent compatibility, transmittance and haze, and the inorganic nanoparticles may be preferably those having a number average diameter of 1 to 50 nm.

Depending on the physical properties to be provided for the anti-reflective film, the anti-reflective coating composition of the present invention may further include other components typically used in the art, in addition to the above-mentioned components. For example, the composition of the present invention may further include an additive such as a surfactant, a leveling agent, a thickener, a silane coupling agent, etc., if necessary. In this regard, the content of the additive may vary, as long as it does not deteriorate physical properties of the composition according to the present invention. Thus, the content of the additive is not particularly limited.

Meanwhile, according to another embodiment of the present invention, provided is a method for manufacturing an anti-reflective film, including the steps of:

preparing the above-mentioned anti-reflective coating composition;

applying the composition onto at least one surface of the substrate film;

drying the applied composition; and curing the dried composition layer.

That is, the method for manufacturing an anti-reflective film according to the present invention may be performed by applying the coating composition onto the substrate film, and drying and curing it according to the typical method, except using the above-mentioned composition. In particular, as the manufacturing method according to the present invention is performed using the above-mentioned composition, spontaneous phase separation occurs to form one or more layers even though the composition is applied by a single coating process. Therefore, an anti-reflective film having superior interface adhesion can be manufactured in a simpler manner. Furthermore, as the manufacturing method according to the present invention is performed using the above-mentioned composition, sufficient curing of each layer formed by spontaneous phase separation can be induced, thereby providing an anti-reflective film having superior scratch resistance.

The manufacturing method of the present invention may be performed using the above-mentioned composition according to the typical wet coating method.

According to one embodiment of the present invention, the above-mentioned anti-reflective coating composition is first prepared, and the prepared composition is applied onto at least one surface of the substrate film.

In this regard, the substrate film is not particularly limited, because a transparent substrate film typically used in the art, such as triacetate cellulose, may be used. In addition, the method of applying the composition onto the substrate film may be performed using a coating apparatus such as wire bar and a method typically used in the art.

Subsequently, the step of drying the applied composition may be performed.

The composition applied onto the substrate film is able to form one or more layers by spontaneous phase separation. At this time, as the initiator having the first molecular weight has a smaller molecular weight, it infiltrates into the lower portion of the coating layer due to gravity. In contrast, the initiator having the higher second molecular weight does not infiltrate into the lower portion of the coating layer, but remains in the upper portion thereof.

That is, according to one embodiment of the present invention, the composition applied onto the substrate film may be spontaneously phase-separated into a first layer containing the initiator having the first molecular weight; and a second layer containing the hollow particles and the initiator having the second molecular weight, in which these layers are formed sequentially from the substrate film.

In this regard, the phase separation of the composition does not artificially occur, but spontaneously occurs over time due to differences in the molecular weight and surface energy. The hollow particles and the initiator having the second molecular weight contained in the second layer may tend to show an increasing distribution ratio far from the substrate film.

In the drying step, therefore, the composition applied onto the substrate film may be left under predetermined conditions for drying. However, in order to facilitate sufficient phase separation of the composition in the drying step, the drying process of the composition is preferably performed at a temperature of 5 to 150° C. for 0.1 to 60 minutes. Through the drying step, the composition is phase-separated into the upper portion of the coating layer that contains hollow particles (second layer, low refractive index layer) and the lower portion of the coating layer that does not substantially contain hollow particles (first layer, high refractive index layer).

Subsequently, the step of curing the dried composition layer may be performed.

In the curing step, polymerization is initiated by irradiating the phase-separated, dried composition layer, thereby curing the composition layer. The curing step may be performed under the photo-curing conditions typically used in the art. However, in order to induce sufficient curing reaction, the curing step of the composition is preferably performed at a UV radiation dose of 0.1 to 2 J/cm$^2$ for 1 to 600 seconds.

Meanwhile, the method for manufacturing the anti-reflective film according to the present invention may further include the steps typically performed in the art before or after each step, in addition to the above-mentioned steps, but the manufacturing method of the present invention is not limited to the above-mentioned steps.

According to still another embodiment of the present invention, provided is an anti-reflective film that is formed by using the above-mentioned composition.

An example of the anti-reflective film according to the present invention may include a first layer that includes a first (meth)acrylate-based binder and the initiator having the first molecular weight in the first (meth)acrylate-based binder, and is formed on the substrate film; and a second layer that includes a second (meth)acrylate-based binder and the hollow particles and the initiator having the second molecular weight higher than the first molecular weight in the second (meth)acrylate-based binder, and is formed on the first layer.

Herein, the first molecular weight may be less than 420, and the second molecular weight may be 420 to 1000.

In the anti-reflective film, the first layer formed on the substrate film may serve as the hard coat layer of the anti-reflective film, and also as the high refractive index layer showing a refractive index of approximately 1.5 or higher. The first layer may include the first (meth)acrylate-based binder and the initiator having the first molecular weight in the binder. In addition, the first (meth)acrylate-based binder may include a crosslinked polymer of the multifunctional (meth)acrylate-based compound having 2 to 10 functional groups, and this binder may further include inorganic nanoparticles.

All or most of the hollow particles (e.g., approximately 97% by weight or more, or approximately 99% by weight or more) are substantially distributed in the second layer that is in contact with and covers the first layer, and the second layer may serve as the low refractive index layer of the anti-reflective film. The second layer may show a low refractive index of approximately 1.45 or less to show the proper anti-reflective effect. The second layer may include the second (meth)acrylate-based binder and the hollow particles and the initiator having the second molecular weight higher than the first molecular weight in the binder. In addition, the second (meth)acrylate-based binder may include a crosslinked polymer of the (meth)acrylate-based compound having a fluorine-containing substituent, and this binder may further include inorganic nanoparticles.

Further, the first and second (meth)acrylate-based binders may further include a crosslinked copolymer of the multifunctional (meth)acrylate-based compound having 2 to 10 functional groups and the (meth)acrylate-based compound having a fluorine-containing substituent, respectively. In this regard, the crosslinked copolymer included in the first (meth)acrylate-based binder may be included in the predetermined region of the first layer, based on the interface between the first layer and the second layer, for example, to approximately 5 to 50% depth, or approximately 4 to 45% depth, or approximately 5 to 40% depth of the first layer. The crosslinked copolymer included in the first binder of the first layer may be included to exhibit an increasing distribution gradient toward the second layer.

As the crosslinked copolymers are distributed with a distribution gradient to the predetermined depth of the first layer, the interface adhesion between the first layer and the second layer can be more improved, and hollow particles included in the second layer can be more compactly distributed.

In this regard, the thickness of the first layer may be 2 to 15 μm, preferably 2 to 15 μm, and more preferably 2 to 10 μm, considering the optical and mechanical properties. The thickness of the second layer may be 100 to 200 nm, preferably 100 to 180 μm, and more preferably 100 to 160 nm, considering the anti-reflective property. As the anti-reflective film of the present invention is manufactured by using the composition including the initiators which satisfy the particular molecular weight range, sufficient curing degree of the second layer can be ensured, thereby providing more improved scratch resistance.

In the above-mentioned anti-reflective film, the first layer has a higher refractive index than the second layer serving as the low refractive index layer, and its refractive index may be approximately 1.5 to 1.58, or approximately 1.5 to 1.57, or approximately 1.51 to 1.56. The refractive index of the second layer may be approximately 1.1 to 1.45, or approximately 1.15 to 1.43, or approximately 1.2 to 1.42.

Further, the anti-reflective film of another embodiment has a reflectance of approximately 0.5 to 4%, or approximately 0.8 to 3%, or approximately 1 to 2% to show excellent anti-reflective properties, and thus it can be properly used as the anti-reflective film in various display devices such as PDP, CRT or LCD.

Hereinafter, preferred Examples of the present invention will be described for better understanding. However, the following Examples are given for illustrative purposes only, and are not intended to limit the present invention.

Example 1

Preparation of Anti-Reflective Coating Composition

A (meth)acrylate-based compound having a fluorine-containing substituent (product name: OPTOOL AR110, solid content: 15% by weight, MIBK solvent, manufactured by DAIKIN) and a multifunctional (meth)acrylate-based compound, pentaerythritol hexaacrylate were mixed at a weight ratio of 1:80 to prepare a photo-curable compound.

Based on 100 parts by weight of the photo-curable compound;

approximately 18.7 parts by weight of hollow silica (manufactured by Catalysts & Chemicals Industries Co., product name: MIBK-sol);

approximately 1 part by weight of Darocur 1173 (molecular weight: approximately 164.2, manufactured by Ciba Chemical), approximately 6 parts by weight of Irgacure 184 (molecular weight: approximately 204.3, manufactured by Ciba Chemical), approximately 2 parts by weight of Irgacure 819 (molecular weight: approximately 418.46, manufactured by Ciba Chemical), and approximately 1 part by weight of Irgacure 907 (molecular weight: approximately 279.4, manufactured by Ciba Chemical) as a initiator having a first molecular weight;

approximately 5 parts by weight of OXE-01C (molecular weight: approximately 440, manufactured by Ciba Chemical) as a initiator having a second molecular weight higher than the first molecular weight; and 164 parts by weight of methyl ethyl ketone, 23 parts by weight of acetyl acetone, 23 parts by weight of ethanol, and 23 parts by weight of n-butanol as a solvent were uniformly mixed to prepare an anti-reflective coating composition.

(Manufacturing of Anti-Reflective Film)

The anti-reflective coating composition was applied to a triacetate cellulose film (thickness of 80 μm) using a wire bar (No. 9). The film was dried in a 90° C. oven for 2 minutes, and then UV energy of 200 mJ/cm$^2$ was irradiated thereto for 5 seconds to cure the composition.

Finally, a film having an anti-reflective coating layer with a thickness of approximately 3 μm (thickness of low refractive index layer including hollow particles: approximately 150 nm) was manufactured.

Example 2

Preparation of Anti-Reflective Coating Composition

A (meth)acrylate-based compound having a fluorine-containing substituent (product name: OPTOOL AR110, solid content: 15% by weight, MIBK solvent, manufactured by DAIKIN) and a multifunctional (meth)acrylate-based compound, pentaerythritol hexaacrylate were mixed at a weight ratio of 1:80 to prepare a photo-curable compound.

Based on 100 parts by weight of the photo-curable compound;

approximately 10.9 parts by weight of hollow silica (manufactured by Catalysts & Chemicals Industries Co., product name: MIBK-sol);

approximately 1 part by weight of Darocur 1173 (molecular weight: approximately 164.2, manufactured by Ciba Chemical), approximately 6 parts by weight of Irgacure 184 (molecular weight: approximately 204.3, manufactured by Ciba Chemical), approximately 2 parts by weight of Irgacure 819 (molecular weight: approximately 418.46, manufactured by Ciba Chemical), and approximately 1 part by weight of Irgacure 907 (molecular weight: approximately 279.4, manufactured by Ciba Chemical) as a initiator having a first molecular weight;

approximately 5 parts by weight of 838.4 (molecular weight: approximately 803.9, manufactured by LG chemical) as a initiator having a second molecular weight higher than the first molecular weight; and 164 parts by weight of methyl ethyl ketone, 23 parts by weight of acetyl acetone, 23 parts by weight of ethanol, and 23 parts by weight of n-butanol as a solvent were uniformly mixed to prepare an anti-reflective coating composition.

(Manufacturing of Anti-Reflective Film)

A film having an anti-reflective coating layer with a thickness of approximately 3 μm (thickness of low refractive index layer including hollow particles: approximately 140 nm) was manufactured according to the method for manufacturing the anti-reflective film of Example 1, except using the above composition.

Example 3

Preparation of Anti-Reflective Coating Composition

A (meth)acrylate-based compound having a fluorine-containing substituent (product name: OPTOOL AR110, solid content: 15% by weight, MIBK solvent, manufactured by DAIKIN) and a multifunctional (meth)acrylate-based compound, pentaerythritol hexaacrylate were mixed at a weight ratio of 1:80 to prepare a photo-curable compound.

Based on 100 parts by weight of the photo-curable compound;

approximately 10.9 parts by weight of hollow silica (manufactured by Catalysts & Chemicals Industries Co., product name: MIBK-sol);

approximately 1 part by weight of Darocur 1173 (molecular weight: approximately 164.2, manufactured by Ciba Chemical), approximately 6 parts by weight of Irgacure 184 (molecular weight: approximately 204.3, manufactured by Ciba Chemical), approximately 2 parts by weight of Irgacure 819 (molecular weight: approximately 418.46, manufactured by Ciba Chemical), and approximately 1 part by weight of Irgacure 907 (molecular weight: approximately 279.4, manufactured by Ciba Chemical) as a initiator having a first molecular weight;

approximately 5 parts by weight of TAZ-110 (molecular weight: approximately 448, manufactured by: Midori Kagaku) as a initiator having a second molecular weight higher than the first molecular weight; and 164 parts by weight of methyl ethyl ketone, 23 parts by weight of acetyl acetone, 23 parts by weight of ethanol, and 23 parts by weight of n-butanol as a solvent were uniformly mixed to prepare an anti-reflective coating composition.

(Manufacturing of Anti-Reflective Film)

A film having an anti-reflective coating layer with a thickness of approximately 3 μm (thickness of low refractive index layer including hollow particles: approximately 140 nm) was manufactured according to the method for manufacturing the anti-reflective film of Example 1, except using the above composition.

Comparative Example 1

Preparation of Anti-Reflective Coating Composition

A (meth)acrylate-based compound having a fluorine-containing substituent (product name: OPTOOL AR110, solid content: 15% by weight, MIBK solvent, manufactured by DAIKIN) and a multifunctional (meth)acrylate-based compound, pentaerythritol hexaacrylate were mixed at a weight ratio of 1:80 to prepare a photo-curable compound.

Based on 100 parts by weight of the photo-curable compound;

approximately 10.9 parts by weight of hollow silica (manufactured by Catalysts & Chemicals Industries Co., product name: MIBK-sol);

approximately 1.5 parts by weight of Darocur 1173 (molecular weight: approximately 164.2, manufactured by Ciba Chemical), approximately 9 parts by weight of Irgacure 184 (molecular weight: approximately 204.3, manufactured by Ciba Chemical), approximately 3 parts by weight of Irgacure 819 (molecular weight: approximately 418.46, manufactured by Ciba Chemical), and approximately 1.5 parts by weight of Irgacure 907 (molecular weight: approximately 279.4, manufactured by Ciba Chemical) as a initiator having a molecular weight of less than 420;

164 parts by weight of methyl ethyl ketone, 23 parts by weight of acetyl acetone, 23 parts by weight of ethanol, and 23 parts by weight of n-butanol as a solvent were uniformly mixed to prepare an anti-reflective coating composition.

(Manufacturing of Anti-Reflective Film)

A film having an anti-reflective coating layer with a thickness of approximately 3 μm (thickness of low refractive index layer including hollow particles: approximately 130 nm) was manufactured according to the method for manufacturing the anti-reflective film of Example 1, except using the above composition.

Experimental Example

The anti-reflective coating films manufactured by Examples 1 to 3 and Comparative Example 1 were measured or evaluated for the following items, and the results are shown in the following Table 1.

1) Measurement of reflectance: the back side of the anti-reflective film was treated with black color, and then a minimum reflectance value was determined. At this time, a Shimadzu Solid Spec. 3700 spectrophotometer was used for measurement.

2) Measurement of transmittance and haze: HR-100 (Murakami Co.) was used to evaluate transmittance and haze.

3) Evaluation of scratch resistance: the anti-reflective film was rubbed using a steel wool with a load of 500 g/cm² at a speed of 24 m/min 10 times, and then the number of scratches having a length of 1 cm or longer was counted. At this time, depending on the number of scratches having a length of 1 cm or longer, it was evaluated as follows: when the numbers of scratch were less than 3, 3 or more to less than 7, 7 or more to less than 10, and 10 or more, the films were evaluated as very excellent (⊚), excellent (○), moderate (Δ), and poor (X), respectively.

TABLE 1

|  | Example 1 | Example 2 | Example 3 | Example 4 |
|---|---|---|---|---|
| Reflectance (%) | 1.00 | 1.03 | 0.99 | 1.21 |
| Transmittance (%) | 95.8 | 95.9 | 96.2 | 96.2 |
| Haze (%) | 0.5 | 0.4 | 0.5 | 0.4 |
| Scratch resistance | ⊚ | ○ | ⊚ | Δ |

As shown in Table 1, the anti-reflective films according to Examples 1 to 3 showed transmittance and haze equivalent to those of the anti-reflective film according to Comparative Example 1, and thus they exhibited excellent transparency.

However, the anti-reflective films according to Examples 1 to 3 showed lower reflectance than the anti-reflective film according to Comparative Example 1. In particular, as the films were manufactured by using the composition including both the initiator having the first molecular weight and the initiator having the second molecular weight higher than the first molecular weight, they had superior scratch resistant surface.

The invention claimed is:

1. An anti-reflective coating composition comprising
a (meth)acrylate-based compound;
5 to 50 parts by weight of hollow particles;
1 to 30 parts by weight of a first initiator having a molecular weight of less than 420;
1 to 20 parts by weight of a second initiator having a molecular weight of 420 to 1000; and
100 to 500 parts by weight of a solvent,
based on 100 parts by weight of the (meth)acrylate-based compound.

2. The anti-reflective coating composition according to claim 1, wherein the (meth)acrylate-based compound includes a multifunctional (meth)acrylate-based compound having 2 to 10 functional groups and a (meth)acrylate-based compound having a fluorine-containing substituent.

3. The anti-reflective coating composition according to claim 2, wherein the (meth)acrylate-based compound includes the (meth)acrylate-based compound having a fluorine-containing substituent and the multifunctional (meth)acrylate-based compound having 2 to 10 functional groups at a weight ratio of 1:10 to 1:300.

4. The anti-reflective coating composition according to claim 2, wherein the (meth)acrylate-based compound having a fluorine-containing substituent and the multifunctional (meth)acrylate-based compound have a surface energy difference of 5 mN/m or higher.

5. The anti-reflective coating composition according to claim 2, wherein the multifunctional (meth)acrylate-based compound is one or more compounds selected from the group consisting of dipentaerythritol hexaacrylate, pentaerythritol triacrylate, pentaerythritol tetraacrylate, trimethylenepropane triacrylate, ethylene glycol diacrylate, 9,9-bis (4-(2-acryloxyethoxy)phenyl)fluorene, and bis(4-methacryloxy thiophenyl)sulfide.

6. The anti-reflective coating composition according to claim 2, wherein the (meth)acrylate-based compound having a fluorine-containing substituent is one or more selected from the group consisting of compounds of the following Chemical Formulae 1 to 5:

[Chemical Formula 1]

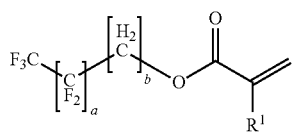

wherein R1 is a hydrogen group or an alkyl group having 1 to 6 carbon atoms, a is an integer of 0 to 7, and b is an integer of 1 to 3;

[Chemical Formula 2]

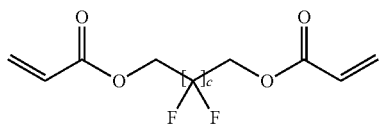

wherein c is an integer of 1 to 10;

[Chemical Formula 3]

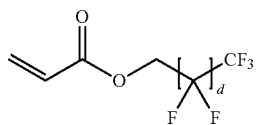

wherein d is an integer of 1 to 11;

[Chemical Formula 4]

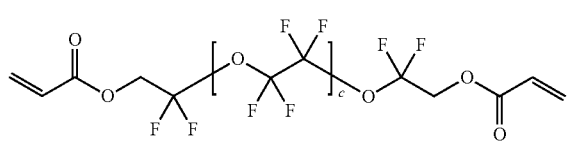

wherein e is an integer of 1 to 5;

[Chemical Formula 5]

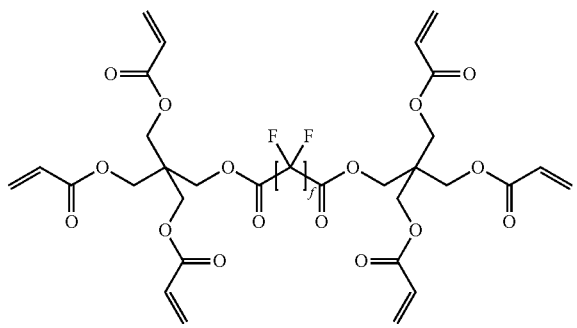

wherein f is an integer of 4 to 10.

7. The anti-reflective coating composition according to claim 1, wherein the hollow particles have a number average diameter of 1 to 200 nm.

8. The anti-reflective coating composition according to claim 1, wherein the hollow particles are hollow silica particles.

9. The anti-reflective coating composition according to claim 1, wherein the solvent has a dielectric constant (25° C.) of 20 to 30, and a dipole moment of 1.7 to 2.8.

10. The anti-reflective coating composition according to claim 1, wherein the solvent is one or more selected from the group consisting of methyl ethyl ketone, ethyl acetate, acetyl acetone, isobutyl ketone, methanol, ethanol, n-butanol, i-butanol, and t-butanol.

11. The anti-reflective coating composition according to claim 1, further comprising inorganic nanoparticles having a number average diameter of 1 to 50 nm.

12. A method for manufacturing an anti-reflective film, comprising the steps of:
preparing the anti-reflective coating composition according to claim 1;
applying the composition onto at least one surface of a substrate film;
drying the applied composition; and
curing the dried composition layer.

13. The method for manufacturing an anti-reflective film according to claim 12, wherein the composition applied onto the substrate film is spontaneously phase-separated into a first layer containing the initiator having the first molecular weight; and a second layer containing the hollow particles and the initiator having the second molecular weight, these layers are formed sequentially from the substrate film.

14. The method for manufacturing an anti-reflective film according to claim 12, wherein the drying process of the composition is performed at a temperature of 5 to 150° C. for 0.1 to 60 minutes.

15. The method for manufacturing an anti-reflective film according to claim 12, wherein the curing process of the composition is performed at a UV radiation dose of 0.1 to 2 J/cm2 for 1 to 600 seconds.

* * * * *